US008982902B1

(12) United States Patent
Naganathan et al.

(10) Patent No.: US 8,982,902 B1
(45) Date of Patent: Mar. 17, 2015

(54) BACKUP SERVER ARCHITECTURE IN A VOIP SYSTEM

(75) Inventors: Venky Naganathan, San Jose, CA (US); Glen Okita, Los Altos, CA (US)

(73) Assignee: ShoreTel, Inc., Sunnyvale, CA (US)

( * ) Notice: Subject to any disclaimer, the term of this patent is extended or adjusted under 35 U.S.C. 154(b) by 141 days.

(21) Appl. No.: 13/536,832

(22) Filed: Jun. 28, 2012

(51) Int. Cl.
*H04M 1/253* (2006.01)
*H04M 3/42* (2006.01)
*H04M 3/44* (2006.01)
*H04M 7/00* (2006.01)

(52) U.S. Cl.
CPC ........ *H04M 1/2535* (2013.01); *H04M 3/42068* (2013.01)
USPC .......................................... 370/462; 370/468

(58) Field of Classification Search
CPC .......... H04M 1/2535; H04M 3/42068; H04M 3/42272; H04M 3/44; H04M 3/54; H04M 3/56; H04M 7/006
USPC ........... 370/254–350, 462, 468; 709/201–213
See application file for complete search history.

(56) References Cited

U.S. PATENT DOCUMENTS

| 7,379,540 | B1 | 5/2008 | Van Gundy |
| 7,450,574 | B1 | 11/2008 | Miller et al. |
| 7,924,823 | B2 | 4/2011 | Miller et al. |
| 7,990,953 | B2 * | 8/2011 | Cheng et al. ................. 370/352 |
| 8,159,935 | B1 | 4/2012 | Fritz |
| 8,359,354 | B1 * | 1/2013 | Do et al. ...................... 709/204 |
| 2006/0098668 | A1 * | 5/2006 | Dona ............................ 370/401 |

OTHER PUBLICATIONS

U.S. Appl. No. 12/414,238, filed Mar. 30, 2009.

* cited by examiner

*Primary Examiner* — Ayaz Sheikh
*Assistant Examiner* — Debebe Asefa
(74) *Attorney, Agent, or Firm* — Kilpatrick Townsend & Stockton LLP

(57) ABSTRACT

A method for providing telephony services in a distributed VoIP system includes determining that a first switch is unable to communicate with a first server, where the first switch is configured to provide telephony services to a first plurality of communication devices, and the first server is configured to provide applications and data associated with the first plurality of communication devices to the first switch. The method also includes sending an adoption request from the first switch to a second server, where the second server is configured to provide applications and data associated with a second plurality of communication devices to a second switch and also configured to provide the applications and data associated with the first plurality of communication devices to the first switch. The method also includes receiving at the first switch the applications and data associated with the first plurality of communication devices from the second server.

24 Claims, 4 Drawing Sheets

BACKUP SERVER ARCHITECTURE IN A VOIP SYSTEM

FIELD OF THE INVENTION

The present invention relates generally to Voice over Internet Protocol (VoIP) systems and, more particularly, to methods and systems for providing telephony services using a backup server architecture in a VoIP system.

BACKGROUND

Unified communications (UC) systems such as VoIP systems offer applications that are enabled by the integration of computer systems with telephony services. A VoIP system typically includes a number of devices, such as switches and servers, distributed across one or more sites that make up the system. As used herein, a site represents a grouping of resources. The resources may be grouped according to location, in which case different sites may be physically distinct from each other, or they may be grouped based on other factors, in which case different sites may or may not be physically distinct from each other.

Availability is an important metric for a VoIP system. Availability is often used to compare services provided by a VoIP system to those provided by a public switched telephone network (PSTN). To achieve required levels of availability, many VoIP systems are designed to have redundancies that can be used in the event of a failure in the system. Redundancies are typically designed on a site-by-site basis, however, because each site has different configuration requirements (e.g., different time zones, language preferences, dialing prefixes, local area codes, etc.). Thus, to achieve required levels of availability, redundant capacity is needed at each site. Availability can be improved by adding additional levels of redundancy. Increasing redundancy by adding additional devices at each site, however, is costly. For example, an "N+1" level of redundancy requires sufficient extra capacity at each site to support the failure of any single device.

Thus, there is a need for improved methods and systems for providing redundancy in a VoIP system.

SUMMARY

Embodiments of the present invention provide improved methods and systems for providing redundancy in a VoIP system. In one embodiment, for example, a server in a distributed VoIP system may be designated as a backup to another server in the system (or to one or more of the switches associated with the other server). During normal operation, both servers provide applications and data associated with different groups of communication devices to different switches. During a backup operation, such as when a server goes down, is taken off-line, or loses communication with one or more of its associated switches, the backup server continues to provide applications and data to those switches with which it is normally associated and also provides applications and data to those switches for which it is designated as a backup.

In accordance with an embodiment of the invention, a distributed VoIP system includes a first server and a first switch. The first switch may be configured to provide telephony services to a first plurality of communication devices, and the first server may be configured to provide applications and data associated with the first plurality of communication devices to the first switch. The distributed VoIP system also includes a second server and a second switch. The second switch may be configured to provide telephony services to a second plurality of communication devices, and the second server may be configured to provide applications and data associated with the second plurality of communication devices to the second switch. The distributed VoIP system also includes a third server and a third switch. The third switch may be configured to provide telephony services to a third plurality of communication devices, and the third server may be configured to provide applications and data associated with the third plurality of communication devices to the third switch. The first switch, the second switch, and the third switch may each be communicatively coupled to the first server, the second server, and the third server. The second server may be further configured to provide the applications and data associated with the first plurality of communication devices to the first switch but is not configured to provide the applications and data associated with the third plurality of communication devices to the third switch.

In an embodiment, the applications associated with the first plurality of communication devices include at least one of conferencing services, auto attendant menus and prompts, work group preferences, call recording services, directory services, voicemail services, an enterprise contact center, call control, or call logging.

In another embodiment, the data associated with the first plurality of communication devices includes at least one of call histories, recorded names, personal contacts, voicemail greetings, or voicemail messages.

In another embodiment, the first plurality of communication devices include at least one of an IP phone, a soft phone, a button box, a conference bridge port, a virtual phone, or a trunk.

In another embodiment, the first switch, the second switch, and the third switch are each communicatively coupled to the first server, the second server, and the third server via a network.

In yet another embodiment, the distributed VoIP system also includes a fourth switch that is configured to provide telephony services to a fourth plurality of communication devices. The first server may be configured to provide applications and data associated with the fourth plurality of communication devices to the fourth switch. The fourth switch may be communicatively coupled to the first server, the second server, and the third server. The third server may be further configured to provide the applications and data associated with the fourth plurality of communication devices to the fourth switch but is not configured to provide the applications and data associated with the second plurality of communication devices to the second switch.

In accordance with another embodiment of the invention, a method for providing telephony services in a VoIP system includes determining that a first switch is unable to communicate with a first server. The first switch may be configured to provide telephony services to a first plurality of communication devices, and the first server may be configured to provide applications and data associated with the first plurality of communication devices to the first switch. The method also includes sending an adoption request from the first switch to a second server. The second server may be configured to provide applications and data associated with a second plurality of communication devices to a second switch and also configured to provide the applications and data associated with the first plurality of communication devices to the first switch. The method also includes receiving at the first switch the applications and data associated with the first plurality of communication devices from the second server.

In an embodiment, the method also includes establishing a communications link between the first switch and the second server before receiving the applications and data associated with the first plurality of communication devices from the second server.

In another embodiment, the method also includes, before determining that the first switch is unable to communicate with the first server, sending events associated with the first plurality of communication devices from the first switch to the first server and to the second server, and receiving at the first switch the applications and data associated with the first plurality of communication devices from only the first server.

In another embodiment, the adoption request is a request from the first switch to receive the applications and data associated with the first plurality of communication devices from the second server.

In another embodiment, the method also includes, after receiving the applications and data associated with the first plurality of communication devices from the second server, determining at the first switch that the first switch is able to communicate with the first server, and thereafter receiving at the first switch the applications and data associated with the first plurality of communication devices from only the first server.

In yet another embodiment, the method also includes, after receiving the applications and data associated with the first plurality of communication devices from the second server, determining at the first switch that the first switch is able to communicate with the first server, requesting at the first switch a configuration timestamp from the first server, determining at the first switch that the configuration timestamp from the first server is older than a configuration timestamp from the second server, and thereafter receiving the applications and data associated with the first plurality of communication devices from the second server.

In accordance with another embodiment of the invention, a method for providing telephony services in a VoIP system includes receiving at a second server an adoption request from a first switch. The first switch may be configured to provide telephony services to a first plurality of communication devices. The adoption request may be sent from the first switch following a loss of communications with a first server that is configured to provide applications and data associated with the first plurality of communication devices to the first switch. The method also includes determining at the second server that resources are available to provide the applications and data associated with the first plurality of communication devices to the first switch. The second server may be configured to provide applications and data associated with a second plurality of communication devices to a second switch and also configured to provide the applications and data associated with the first plurality of communication devices to the first switch. The method also includes determining that the second server can communicate with a main server, and sending from the second server to the main server a message indicating that the second server will provide the applications and data associated with the first plurality of communication devices to the first switch. The method also includes sending from the second server to the first switch a message indicating that the adoption request is accepted, and providing the applications and data associated with the first plurality of communication devices from the second server to the first switch.

In an embodiment, a database associated with the main server stores configuration information including a list of each server and each switch in the distributed VoIP system and those switches that are receiving applications and data from each server.

In another embodiment, the main server includes a plurality of servers, and the message indicating that the second server will provide the applications and data associated with the first plurality of communication devices to the first switch is sent from the second server to only one of the plurality of servers.

Numerous benefits are achieved using embodiments of the present invention over conventional techniques. For example, some embodiments provide server redundancy across sites despite differences in configuration between the sites. A server that is designated as a backup can be configured just like the server it is backing up. Any events or information that are provided from a switch to a server during normal operation can also be provided to the backup. Further, a server can be designated and configured as a backup despite also being an active server that provides applications and data to one or more switches during normal operation. This allows a VoIP system to provide server redundancy without having to set aside servers strictly for backup purposes. Other embodiments can reduce a burden during backup operation by assigning different switches that are registered with a particular server to different backup servers. In this scenario, if a server goes down and the switches need to seek backup resources, they do not burden the same backup server. Instead, each switch seeks backup resources from a different server that is designated as its backup.

Depending on the embodiment, one or more of these benefits may exist. These and other benefits are described throughout the specification and more particularly below.

DETAILED DESCRIPTION

Embodiments of the present invention provide methods and systems for providing telephony services using a backup server architecture in a VoIP system. Merely by way of example, each of the switches in a VoIP system may be assigned a primary server and a backup server. Even the backup servers, however, act as primary servers to other switches in the system. The primary server provides applications and data during normal operation, and the backup server provides the applications and data when the primary server is unable to do so (e.g., when the primary goes down, is taken off-line, or loses communication with the switch). In some embodiments, provisions are also made for situations in which both the primary server and the backup server are unable to provide the applications and data. Other embodiments include provisions for switching back to a primary server after receiving the applications and data from a backup server. These and other embodiments are described more fully below with reference to the various drawings.

Figure 1:
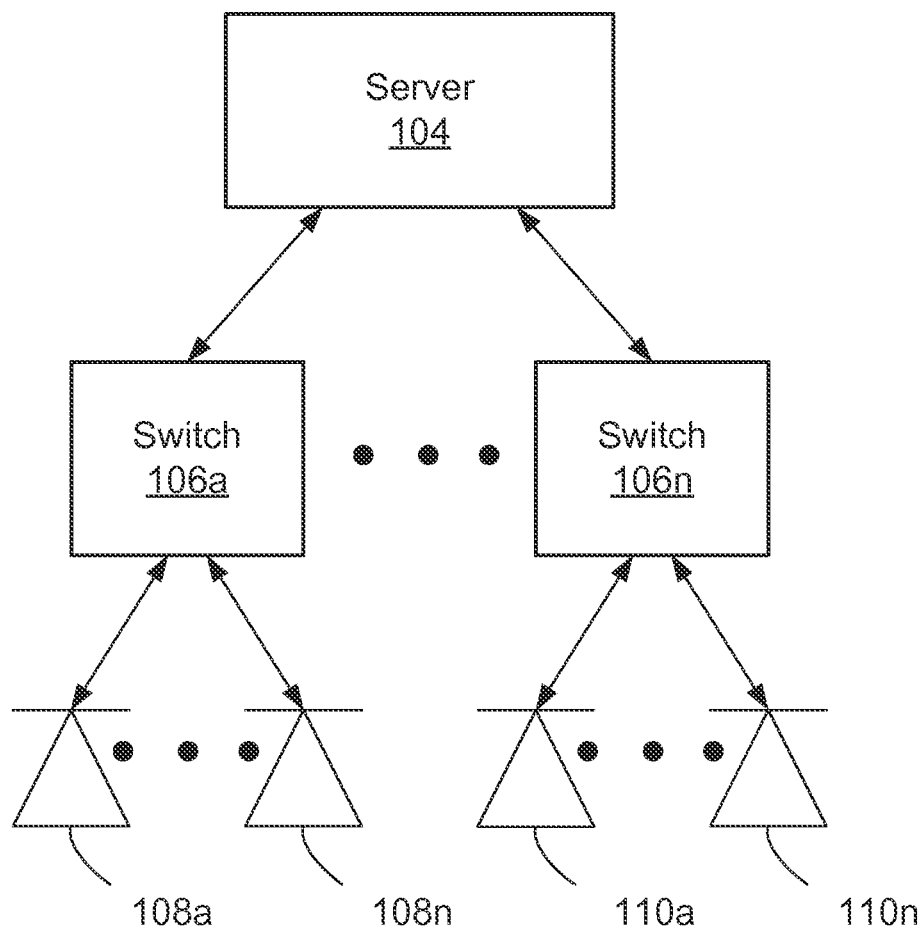
FIG. 1 is a simplified block diagram of a VoIP system in accordance with an embodiment of the invention.

FIG. 1 is a simplified block diagram of a VoIP system in accordance with an embodiment of the invention. In this example, a server 104 is coupled with switches 106a, 106n, and the switches 106a, 106n are coupled with communication devices 108a, 108n and 110a, 110n respectively. It should be appreciated that FIG. 1 is used merely as an example and that typical VoIP systems may include any number of servers, switches, communication devices, and other components (e.g., data storage devices, conference bridges, soft phones, and the like). Each of these devices and components may be coupled directly via wired and/or wireless links or coupled via a network such as the Internet, and intranet, or any other network over which a VoIP system operates.

The ellipsis between the switches 106a, 106n in FIG. 1 is intended to indicate that the server 104 may be coupled with any number of switches (including no switches), and the ellipses between the communication devices 108a, 108n and 110a, 110n are intended to indicate that the switches 106a, 106n may each be coupled with any number of communication devices (including no communication devices). The exact configuration may depend on such factors as configuration of the device, design of the system, and utilization of the device and/or system.

The server 104 is typically configured to provide applications and data associated with the communication devices 108a, 108n and 110a, 110n to the switches 106a, 106n respectively. The applications and data generally enhance the telephony services provided by the switches 106a, 106b. Applications that may be provided by the server 104 include conferencing services, auto attendant menus and prompts, work group preferences, call recording services, directory services, voicemail services, an enterprise contact center, call control, call logging, and the like. Data that may be provided by the server 104 includes call histories, recorded names, personal contacts, voicemail greetings, voicemail messages, and the like. Some of the applications and data may be provided by other devices via the server 104. The server 104 may also gather and store information and events associated with the communications devices 108a, 108n, 110a, 110n, and some of the applications may utilize or provide access to the information and events.

The server 104 typically includes familiar server components such as a processor, data storage, I/O devices, a system bus, and an operating system. The server 104 could also be a virtual machine or collocated with the switches 106a, 106b in an appliance model. The data storage may be used to store the applications and data. The data storage may include tangible media such as RAM, disk drives, magnetic storage media, optical storage media, semiconductor memories such as flash, networked storage devices, and the like. The data storage may also include a database such as those powered by My SQL, Oracle, Sybase, and the like or other data sources such as an LDAP server. In some embodiments, the server 104 may be configured to provided at least a portion of the functionality normally provided by the switches 1106a, 106n.

The switches 106a, 106n can be used to establish communications channels between the communication devices 108a, 108n and 110a, 110n and other communication devices that may be internal or external to the VoIP system. The communications channels may be used for phone calls and/or other communications. The switches 106a, 106n are typically configured to manage the state and connections of the communication devices 108a, 108n and 110a, 110n as well as to perform functions such as call setup, resource allocation, provisioning, and the like.

The switches 106a, 106n typically include familiar hardware and software components such as a processor, data storage, I/O devices, a system bus, and an operating system. In some embodiments, the switches 106a, 106n may be configured to provide at least a portion of the functionality normally provided by the server 104. In other embodiments, functions of the server 104 and switches 106a, 106n may be integrated in a single device.

The communication devices 108a, 108n, 110a, 110n are generally used to make or receive phone calls and/or other communications. Such communications may take the form of audio, video, fax, and the like. The communication devices 108a, 108n, 110a, 110n may include IP phones, softphones, button boxes, conference bridge ports, virtual phones, trunks (e.g., analog trunks, digital trunks, Basic Rate Interface (BRI) trunks, Primary Rate Interface (PRI) trunks), and the like.

In accordance with an embodiment of the invention, redundancy for server 104 is provided by one or more other servers within the VoIP system. Each of the switches 106a, 106n have another server that is designated as its backup. In some embodiments, these backup servers are not spare servers in the sense that during normal operation they are idle or are inactive. Instead, the backup servers may be active servers that provide applications and data associated with a group of communication devices to one or more switches within the VoIP system. In other embodiments, the backup servers may be spare servers that are shared as backups by one or more active servers in the system.

In some embodiments, the designation as a backup is made at a server level (one server is designated as a backup for each of the switches 106a, 106n associated with the server 104) while in other embodiments, the designation as a backup is made at a switch level (one server is designated as a backup for the switch 106a while a another server may designated as a backup for the switch 106n). In yet other embodiments, the designation as a backup is made at site level (one server is designated as a backup for the switches 106a, 106n at a particular site). These designations are typically determined by a system administrator during initial system setup but may also be determined after deployment or changed as deemed necessary. The designations may be made based on any number of factors including switch or server utilization, availability, location, and the like. In some embodiments the system administrator may enable or disable backup designations and/or capabilities.

The designation as a backup changes a configuration of a server. With regards to the switches 106a, 106n and the communication devices 108a, 108n, 110a, 110n, the backup server may be configured in a manner similar to that of the server 104. Additionally, any events or information provided from the switches 106a, 106n to the server 104 during normal operation may also be provided to the backup server. These events or information include voicemail boxes, voicemail recorded names and greetings, call histories, personal contacts, and the like. Alternatively, the backup server may sync with the server 104 to obtain any events or information provided from the switches 106a, 106n to the server 104. In this manner, the backup server may have the information necessary to provide the applications and data associated with the communication devices 108a, 108n, 110a, 110n to the switches 106a, 106n. Any of the applications or data that were provided by other devices via the server 104 can be provided via the backup server. Such backup services may be required if the server 104 were to go down, go offline, or lose communications with the switches 106a, 106n.

Figure 2:
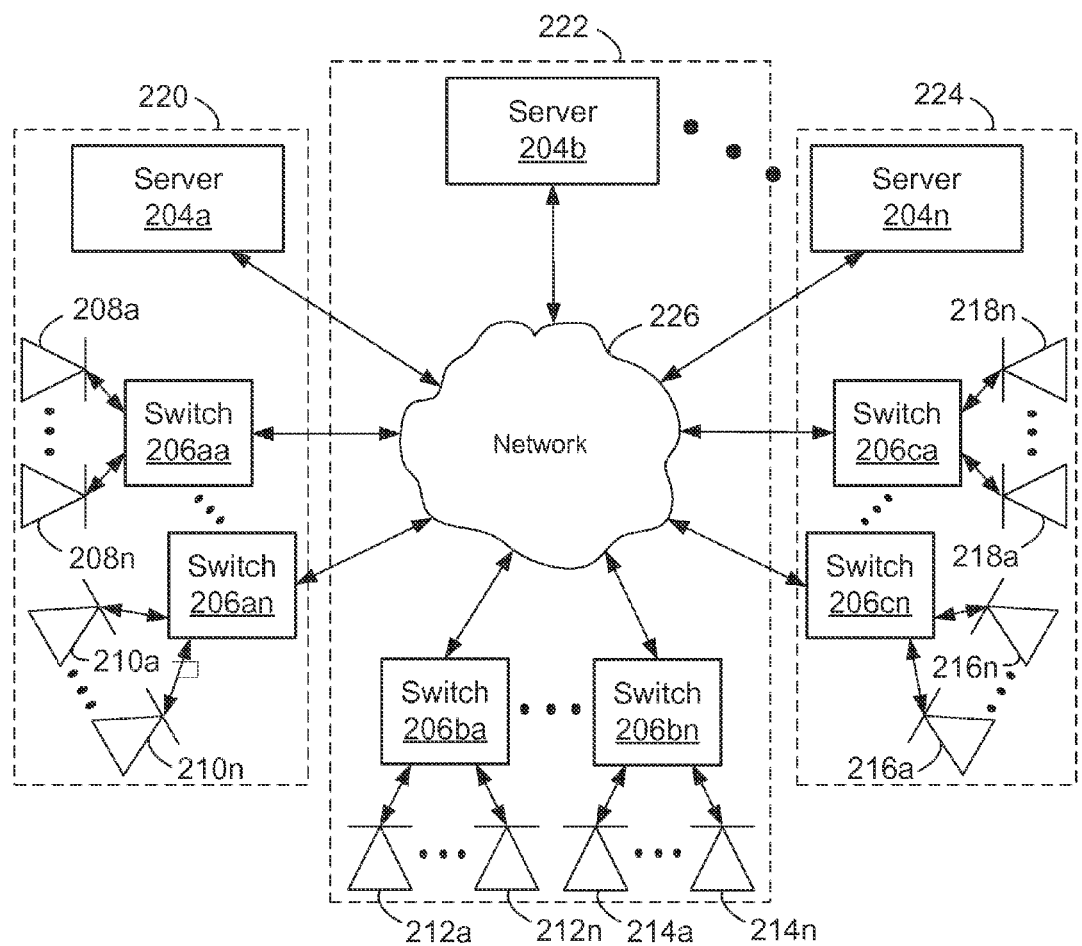
FIG. 2 is a simplified block diagram illustrating a backup server architecture in a distributed VoIP system in accordance with an embodiment of the invention.

FIG. 2 is a simplified block diagram illustrating a backup server architecture in a distributed VoIP system in accordance with an embodiment of the invention. This example includes a first site 220, a second site 222, and a third site 224. Each of the sites in this example include one server and one or more switches that each support one or more communication devices. It should be appreciated that this example is used merely to illustrate features of the present invention, and the methods and systems described herein may be applied to VoIP systems having different configurations.

The first site 220 includes a server 204a, one or more switches 206aa, 206an, and a number of communication devices 208a, 208n, 210a, 210n. The second site 222 is configured in a similar manner and includes a server 204b, one or more switches 206ba, 206bn, and a number of communication devices 212a, 212n, 214a, 214n. The third site 224 is also configured in a similar manner and includes a server 204n, one or more switches 206ca, 206cn, and a number of communication devices 216a, 216n, 218a, 218n.

In this example, the network 226 is shown as being within the second site 222. This is merely for ease of illustration. It should be appreciated that the network 226 may extend across all sites and may represent any number of different networks or connections (including direct links between devices). Thus, embodiments of the present invention should not be limited based on configuration of a particular network or VoIP system.

In FIG. 2, each of the servers 204a, 204b, 204n provide applications and data associated with different communication devices to different switches. For example, the server 204b provides applications and data associated with communication devices 212a, 212n and 214a, 214n to the switches 206ba, 206bn respectively. Additionally, the server 204b may be designated as a backup to the server 204a. As a result, the server 204b may be configured to provide applications and data associated with the communication devices 208a, 208n and 210a, 210n to the switches 206aa, 206an respectively. To keep the configuration up to date, any events and/or information provided from the switches 206aa, 206an to the server 204a during normal operation may also be provided to the server 204b. Alternatively, the server 204b may sync with the server 204a to obtain any events or information provided from the switches 206aa, 206an to the server 204a during normal operation.

In this example, while the server 204b is configured as a backup to the server 204a, the server 204b is not configured as a backup to the server 204n. Configuring each server as a backup to every other server would require significant resources. This would also increase network congestion as each switch would provide events and information to one primary server and multiple back servers during normal operation. Thus, in this example, a server is designated as a backup to one or more servers (or one or more switches) and is not designated as a backup to one or more other servers (or one or more other switches).

Figure 3:
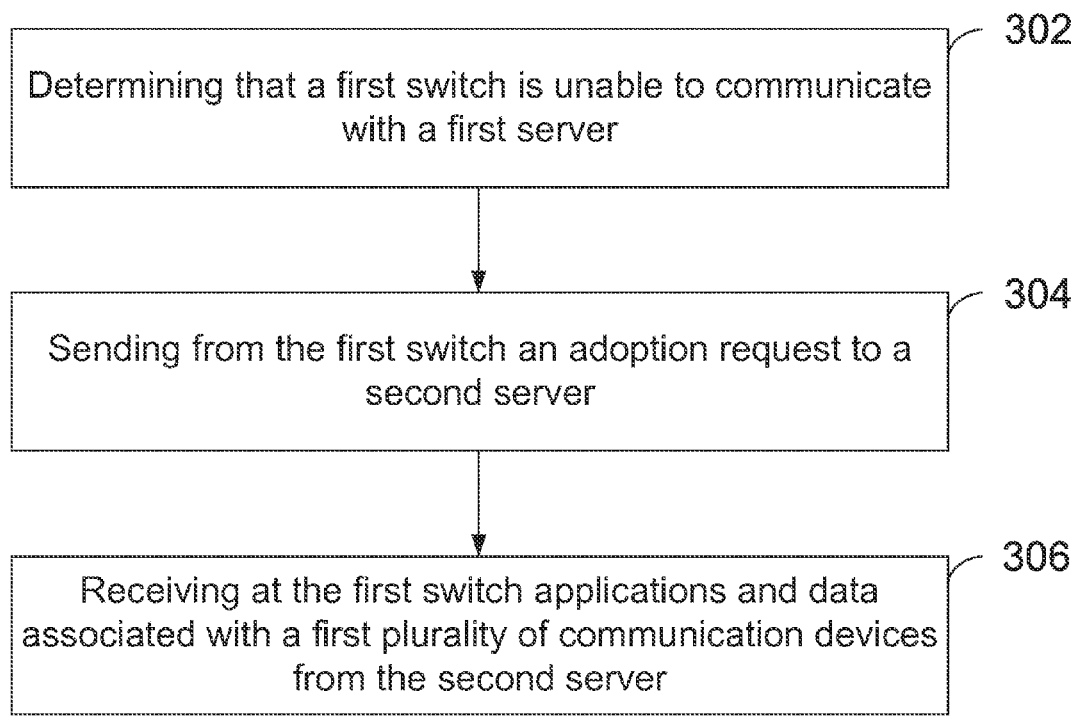
FIGS. 3-4 are flowcharts illustrating exemplary methods for providing telephony services in a VoIP system in accordance with embodiments of the invention.

FIG. 3 is a flowchart illustrating an exemplary method for providing telephony services in a VoIP system in accordance with an embodiment of the invention. The method includes determining that the first switch is unable to communicate with a first server (302). The first switch may be configured to provide telephony services to a first plurality of communication devices, and the first server may be configured to provide applications and data associated with the first plurality of communication devices to the first switch. The first switch may not be able to communicate with the first server for any number of reasons including that the first server is down, the first server is off-line, or network problems are preventing communications. The first switch may continue to support existing and new phone calls to or from the first plurality of communication devices, but functionality provided by the first server is not be available without communications between the first switch and the first server.

In some embodiments, the first switch may wait a period of time after determining that it is unable to communicate with the first server and then retry communication. In this manner, the first switch may avoid taking unnecessary actions if communications are only temporarily lost and are then restored.

In other embodiments, before determining that the first switch is unable to communicate with the first server, events associated with the first plurality of communication devices may be sent from the first switch to the first server and to the second server and the applications and data associated with the first plurality of communication devices may be received from only the first server.

The method also includes sending from the first switch an adoption request to a second server (304). The first switch recognizes the loss of communications with the first server and initiates an adoption request with the second server. The second server is configured to provide applications and data associated with a second plurality of communication devices to a second switch and also configured to provide the applications and data associated with the first plurality of communication devices to the first switch.

In this example, the second server is designated as a backup to the first server. The backup designation may be specified, for example, within a configuration file at the first switch or at a main server within the VoIP system. In an embodiment, the adoption request is a request from the first switch to receive the applications and data associated with the first plurality of communication devices from the second server.

The method also includes receiving at the first switch the applications and data associated with the first plurality of communication devices from the second server (306). This may include establishing a communications link between the first switch and the second server. In some embodiments, the second server may determine that it has capacity to support the first switch before it accepts the adoption request and starts providing the applications and data associated with the first plurality of communication devices to the first switch. In some embodiments the second server may deny the request if it does not have the capacity to support the first switch.

Most VoIP systems designate one server within the system as a main server. The main server may include configuration information for the system. This configuration information may include a list of each server and switch in the system and those switches that are receiving applications and data from each server. The configuration information may be stored locally in memory at the main server or in a database. If the VoIP system includes a main server, the second server may also verify that it can update the configuration at the main server before accepting the adoption request from the first switch.

Some VoIP systems may have a distributed database, and the configuration information indicating the switches that are receiving applications and data from each server may be partitioned across multiple servers. In such a VoIP system, the second server may verify that it can update the configuration of the distributed database instance that indicates the server that is associated with the first switch.

In some embodiments, if the adoption request is denied, the first switch may send a second adoption request to a second backup server in the VoIP system. There may be an implicit association between the first switch and the second backup server based on a heuristic such as a site hierarchy. Alternatively, the second backup server may be designated by an administrator in a manner similar to that of the backup server. Also like the backup server, the designation of the second backup server may be specified, for example, within a configuration file at the first switch or at a main server within the VoIP system. Unlike the backup server, however, the second backup server may not be configured like the first server and may not have received the events or information necessary to provide the applications and data associated with the first plurality of communication devices to the first switch. As a result, the second backup server may be considered a dataless backup and provide only those applications and data that do not require prior configuration or do not require events or information from the first switch. In a manner similar to that described above, in some embodiments the first switch may send a third adoption request to a third backup server if the second adoption request is denied. This may continue in a round robin manner until an adoption request is accepted.

In some embodiments, after receiving the applications and data associated with the first plurality of communication devices from the second server, the first switch may determine that it is once again able to communicate with the first server. The first switch may once again receive the applications and data associated with the first plurality of communication devices from the first server. This may be referred to as a failback procedure. In some embodiments the switch may initiate the failback procedure automatically, while in other embodiments the failback procedure may be initiated by a system administrator. The VoIP system may provide alerts based on various thresholds to indicate an imbalance in resource utilization and to assist in restoring balance following failure of a device.

In other embodiments, after receiving the applications and data associated with the first plurality of communication devices from the second server, the first switch may determine that it is able to communicate with the first server again and request a configuration timestamp from the first server. The first switch may determine that it is able to communicate with the first server as a result of the first server attempting to provide the applications and data associated with the first plurality of communication devices to the first switch. The first switch may determine that the configuration timestamp from the first server is older than a configuration timestamp from the second server and continue receiving the applications and data associated with the first plurality of communication devices from the second server.

It is possible for a server acting in a backup capacity to go down or lose communications with one or more of the switches with which it is providing applications and data. In this scenario, the one or more switches receiving the applications and data from the backup server may be configured to send an adoption request to its original (or primary) server. The process may be similar to that described above with regard to FIG. 3

Figure 4:
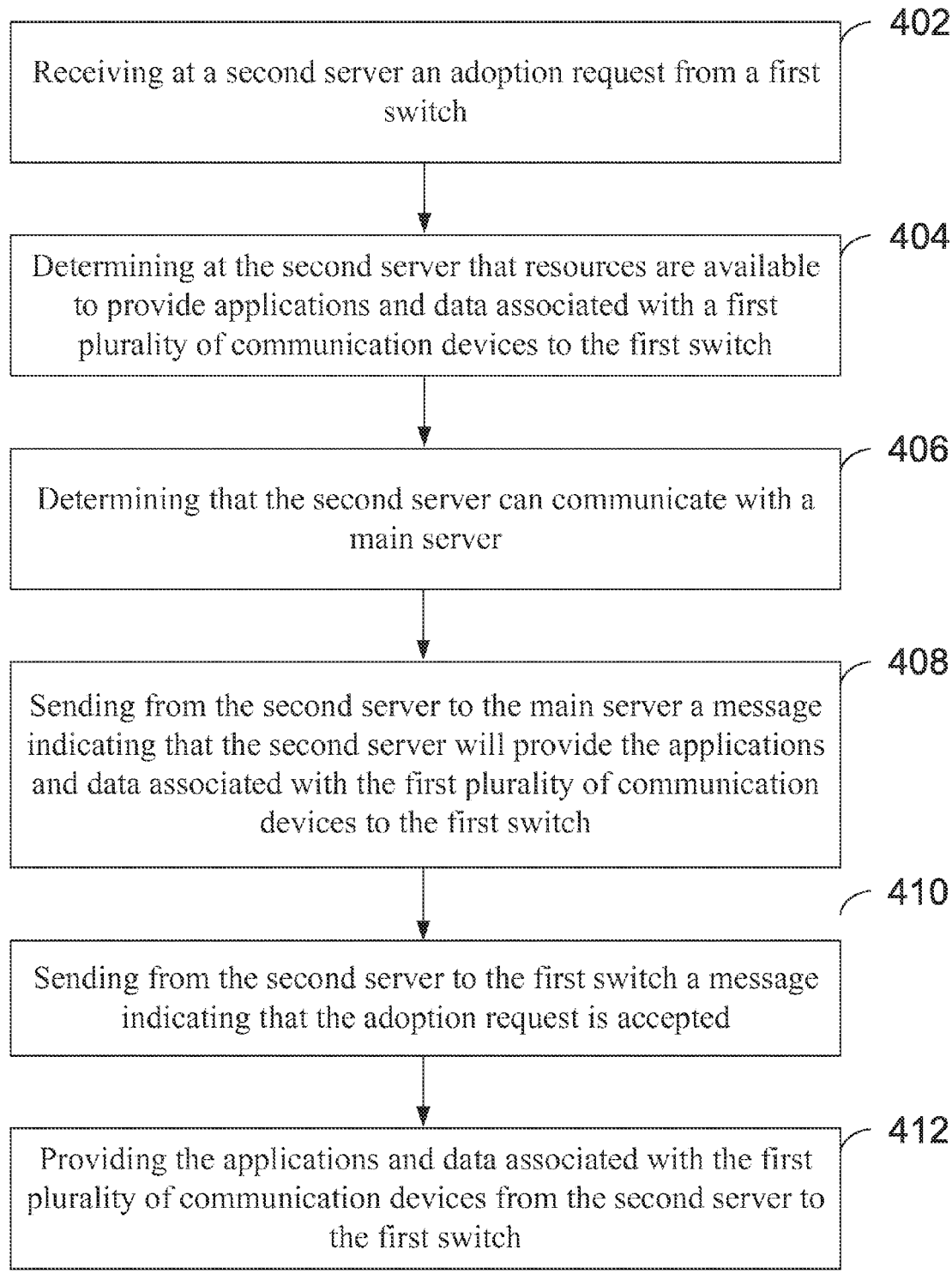

FIG. 4 is a flowchart illustrating an exemplary method for providing telephony services in a VoIP system in accordance with another embodiment of the invention. The method includes receiving at a second server an adoption request from a first switch (402). The first switch may be configured to provide telephony services to a first plurality of communication devices. The adoption request may be sent from the first switch following a loss of communications with a first server that is configured to provide applications and data associated with the first plurality of communication devices to the first switch.

The method also includes determining at the second server that resources are available to provide applications and data associated with a first plurality of communication devices to the first switch (404). The second server may be configured to provide applications and data associated with a second plurality of communication devices to a second switch and also configured to provide the applications and data associated with the first plurality of communication devices to the first switch.

The method also includes determining that the second server can communicate with a main server (406). The main server may include configuration information for the VoIP system, including a list of each server and switch in the system and those switches that are receiving applications and data from each server.

In some embodiments, the second server may deny the adoption request if it cannot communicate with the main server. This is because conflicts may arise if other devices in the system are not aware that the second server has started providing the applications and data associated with the first plurality of communication devices to the first switch.

In other embodiments, the second server may accept the request even though it cannot communicate with the main server. This is because the VoIP system may be able to tolerate some conflicts. As an example, in a VoIP system with a distributed database where the second server is providing applications and data associated with the first plurality of communication devices to the first switch, a call to one of the first plurality of communication devices may be sent to a communication device that is not associated with the second server. In such a situation, the call to the particular communication device may ring unattended and a message may be sent to voicemail. The voicemail message will be delivered to the particular communication device when full communications are restored.

The method also includes sending from the second server to the main server a message indicating that the second server will provide the applications and data associated with the first plurality of communication devices to the first switch (408). The main server can update the system configuration to indicate that the first switch is receiving the applications and data from the second server. Alternatively, the second server may update a distributed database if one is available locally.

The method also includes sending from the second server to the first switch a message indicating that the adoption request is accepted (410). This may include establishing a communications link between the first switch and the second server. The method also includes providing the applications and data associated with the first plurality of communication devices from the second server to the first switch (412). While providing the applications and data to the first switch, the second server may continue to provide the applications and data associated with a second plurality of communication devices to a second switch.

It should be appreciated that the specific steps illustrated in FIGS. 3-4 provide particular methods for providing telephony services in a distributed VoIP system according to some embodiments of the present invention. Other sequences of steps may also be performed according to alternative embodiments. For example, alternative embodiments of the present invention may perform the steps outlined above in a different order. Moreover, the individual steps illustrated in FIGS. 3-4 may include multiple sub-steps that may be performed in various sequences as appropriate to the individual step. Furthermore, additional steps may be added or removed depending on the particular application.

It should be appreciated that some embodiments of the present invention may be implemented by hardware, software, firmware, virtual machine, middleware, microcode, hardware description languages, or any combination thereof. When implemented in software, firmware, middleware, or microcode, the program code or code segments to perform the necessary tasks may be stored in a computer-readable medium such as a storage medium. Processors may be adapted to perform the necessary tasks. The term "computer-readable medium" includes, but is not limited to, portable or fixed storage devices, optical storage devices, wireless channels, sim cards, other smart cards, and various other non-transitory mediums capable of storing, containing, or carrying instructions or data.

While the present invention has been described in terms of specific embodiments, it should be apparent to those skilled in the art that the scope of the present invention is not limited to the embodiments described herein. For example, features of one or more embodiments of the invention may be combined with one or more features of other embodiments without departing from the scope of the invention. The specification and drawings are, accordingly, to be regarded in an illustrative rather than a restrictive sense. The scope of the present invention should be determined not with reference to the above description, but should be determined with reference to the appended claims along with their full scope of equivalents.

What is claimed is:

1. A method for providing telephony services in a VoIP system, the method comprising:
   providing applications and data associated with a first plurality of communication devices from a first server to a first switch, the first switch configured to provide the telephony services to the first plurality of communication devices, and the first server configured to provide the applications and data associated with the first plurality of communication devices to the first switch;
   providing applications and data associated with a second plurality of communication devices from a second server to a second switch, the second switch configured to provide the telephony services to the second plurality of communication devices, and the second server configured to provide the applications and data associated with the second plurality of communication devices to the second switch;
   providing applications and data associated with a third plurality of communication devices from a third server to a third switch, the third switch configured to provide the telephony services to the third plurality of communication devices, and the third server configured to provide the applications and data associated with the third plurality of communication devices to the third switch, wherein the second server is further configured to provide the applications and data associated with the first plurality of communication devices to the first switch but is not configured to provide the applications and data associated with the third plurality of communication devices to the third switch; thereafter
   determining that the first switch is unable to communicate with the first server;
   sending an adoption request from the first switch to the second server;
   providing the applications and data associated with the first plurality of communication devices from the second server to the first switch while providing the applications and data associated with the second plurality of communication devices from the second server to the second switch.

2. The method of claim 1 further comprising:
   establishing a communications link between the first switch and the second server before receiving the applications and data associated with the first plurality of communication devices from the second server.

3. The method of claim 1 further comprising:
   before determining that the first switch is unable to communicate with the first server:
      sending events associated with the first plurality of communication devices from the first switch to the first server and to the second server; and
      receiving at the first switch the applications and data associated with the first plurality of communication devices from only the first server.

4. The method of claim 1 wherein the adoption request is a request from the first switch to receive the applications and data associated with the first plurality of communication devices from the second server.

5. The method of claim 1 further comprising:
   after receiving the applications and data associated with the first plurality of communication devices from the second server:
      determining at the first switch that the first switch is able to communicate with the first server; and thereafter
      receiving at the first switch the applications and data associated with the first plurality of communication devices from only the first server.

6. The method of claim 1 further comprising:
   after receiving the applications and data associated with the first plurality of communication devices from the second server:
      determining at the first switch that the first switch is able to communicate with the first server;
      requesting at the first switch a configuration timestamp from the first server;
      determining at the first switch that the configuration timestamp from the first server is older than a configuration timestamp from the second server; and thereafter
      receiving the applications and data associated with the first plurality of communication devices from the second server.

7. The method of claim 1 wherein the applications associated with the first plurality of communication devices include at least one of conferencing services, auto attendant menus and prompts, work group preferences, call recording services, directory services, voicemail services, an enterprise contact center, call control, or call logging.

8. The method of claim 1 wherein data associated with the first plurality of communication devices includes at least one of call histories, recorded names, personal contacts, voicemail greetings, or voicemail messages.

9. The method of claim 1 wherein the first plurality of communication devices include at least one of an IP phone, a soft phone, a button box, a conference bridge port, a virtual phone, or a trunk.

10. A method for providing telephony services in a VoIP system, the method comprising:
    providing applications and data associated with a first plurality of communication devices from a first server to a first switch, the first switch configured to provide the telephony services to the first plurality of communication devices, and the first server configured to provide the applications and data associated with the first plurality of communications devices to the first switch, wherein the first server is further configured to provide applications and data associated with a second plurality of communication devices to a second switch in the VoIP system but is not configured to provide applications and data associated with a third plurality of communication devices to a third switch in the VoIP system; thereafter
    receiving at the first server an adoption request from the second switch, the adoption request sent from the second switch following a loss of communications with a second server that is configured to provide the applications and data associated with the second plurality of communication devices to the second switch;

determining at the first server that resources are available to provide the applications and data associated with the second plurality of communication devices to the second switch;

determining that the first server can communicate with a main server;

sending from the first server to the main server a message indicating that the first server will provide the applications and data associated with the second plurality of communication devices to the second switch;

sending from the first server to the second switch a message indicating that the adoption request is accepted; and thereafter providing the applications and data associated with the second plurality of communication devices from the first server to the second switch while providing the applications and data associated with the first plurality of communication devices from the first server to the first switch.

11. The method of claim 10 wherein a database associated with the main server stores configuration information including a list of each server and each switch in the distributed VoIP system and those switches that are receiving applications and data from each server.

12. The method of claim 10 wherein the main server includes a plurality of servers, and the message indicating that the first server will provide the applications and data associated with the second plurality of communication devices to the second switch is sent from the first server to only one of the plurality of servers.

13. The method of claim 10 wherein the applications associated with the first plurality of communication devices include at least one of conferencing services, auto attendant menus and prompts, work group preferences, call recording services, directory services, voicemail services, an enterprise contact center, call control, or call logging.

14. The method of claim 10 wherein data associated with the first plurality of communication devices includes at least one of call histories, recorded names, personal contacts, voicemail greetings, or voicemail messages.

15. The method of claim 10 wherein the first plurality of communication devices include at least one of an IP phone, a soft phone, a button box, a conference bridge port, a virtual phone, or a trunk.

16. A method for providing telephony services in a VoIP system, the method comprising:

providing applications and data associated with a first plurality of communication devices from a first server to a first switch, the first switch configured to provide the telephony services to the first plurality of communication devices, and the first server configured to provide the applications and data associated with the first plurality of communications devices to the first switch, wherein the first server is further configured to provide applications and data associated with a second plurality of communication devices to a second switch in the VoIP system but is not configured to provide applications and data associated with a third plurality of communication devices to a third switch in the VoIP system; thereafter receiving at the first server an adoption request from the second switch, the adoption request sent from the second switch following a loss of communications with a second server that is configured to provide the applications and data associated with the second plurality of communication devices to the second switch;

determining at the first server that insufficient resources are available to provide the applications and data associated with the second plurality of communication devices to the second switch;

sending from the first server to the second switch a message indicating that the adoption request is denied; and thereafter providing the applications and data associated with a first plurality of communication devices from the first server to only the first switch.

17. A method for providing telephony services in a VoIP system, the method comprising:

providing applications and data associated with a first plurality of communication devices from a first server to a first switch, the first switch configured to provide the telephony services to the first plurality of communication devices, and the first server configured to provide the applications and data associated with the first plurality of communication devices to the first switch;

providing applications and data associated with a second plurality of communication devices from a second server to a second switch, the second switch configured to provide the telephony services to the second plurality of communication devices, and the second server configured to provide the applications and data associated with the second plurality of communication devices to the second switch;

providing applications and data associated with a third plurality of communication devices from a third server to a third switch, the third switch configured to provide the telephony services to the third plurality of communication devices, and the third server configured to provide the applications and data associated with the third plurality of communication devices to the third switch, wherein the second server is further configured to provide the applications and data associated with the first plurality of communication devices to the first switch but is not configured to provide the applications and data associated with the third plurality of communication devices to the third switch; thereafter determining that the first switch is unable to communicate with the first server;

sending an adoption request from the first switch to the second server;

receiving at the first switch a message from the second server indicating that the adoption request is denied; thereafter sending a second adoption request from the first switch to the third server; and receiving at the first switch a message from the third server indicating that the second adoption request is accepted.

18. The method of claim 17 wherein the first switch is associated with the third server based on a site hierarchy.

19. The method of claim 17 wherein the applications associated with the first plurality of communication devices include at least one of conferencing services, auto attendant menus and prompts, work group preferences, call recording services, directory services, voicemail services, an enterprise contact center, call control, or call logging.

20. The method of claim 17 wherein data associated with the first plurality of communication devices includes at least one of call histories, recorded names, personal contacts, voicemail greetings, or voicemail messages.

21. The method of claim 16 wherein the applications associated with the first plurality of communication devices include at least one of conferencing services, auto attendant menus and prompts, work group preferences, call recording services, directory services, voicemail services, an enterprise contact center, call control, or call logging.

22. The method of claim 16 wherein data associated with the first plurality of communication devices includes at least one of call histories, recorded names, personal contacts, voicemail greetings, or voicemail messages.

23. The method of claim 16 wherein the first plurality of communication devices include at least one of an IP phone, a soft phone, a button box, a conference bridge port, a virtual phone, or a trunk.

24. The method of claim 16 wherein the adoption request is a request from the second switch to receive the applications and data associated with the second plurality of communication devices from the first server.

* * * * *